United States Patent
Pawlowski et al.

[19]

[11] Patent Number: 5,923,857
[45] Date of Patent: Jul. 13, 1999

[54] METHOD AND APPARATUS FOR ORDERING WRITEBACK DATA TRANSFERS ON A BUS

[75] Inventors: Stephen S. Pawlowski, Beaverton; Peter D. MacWilliams, Aloha; Nitin V. Sarangdhar; Gurbir Singh, both of Portland, all of Oreg.

[73] Assignee: Intel Corporation, Santa Clara, Calif.

[21] Appl. No.: 08/708,922

[22] Filed: Sep. 6, 1996

[51] Int. Cl.[6] .............................. G06F 13/14; G06F 12/00
[52] U.S. Cl. .............................................. 395/287; 711/143
[58] Field of Search .................................. 395/287, 292, 395/293, 872; 711/117, 118, 119, 143, 146

[56] References Cited

U.S. PATENT DOCUMENTS

| | | | |
|---|---|---|---|
| 4,843,542 | 6/1989 | Dashiell et al. | 711/119 |
| 5,222,224 | 6/1993 | Flynn et al. | 711/144 |
| 5,329,622 | 7/1994 | Belsan et al. | 711/113 |
| 5,361,345 | 11/1994 | English | 395/182.03 |
| 5,546,546 | 8/1996 | Bell et al. | 395/292 |
| 5,550,988 | 8/1996 | Sarangdhar et al. | 395/293 |
| 5,568,620 | 10/1996 | Sarangdhar et al. | 395/285 |
| 5,615,343 | 3/1997 | Sarangdhar et al. | 395/282 |
| 5,623,628 | 4/1997 | Brayton et al. | 395/468 |
| 5,668,975 | 9/1997 | Coddington | 711/169 |
| 5,682,516 | 10/1997 | Sarangdhar et al. | 395/473 |
| 5,694,567 | 12/1997 | Bourekas et al. | 711/3 |

OTHER PUBLICATIONS

Popescu, Val, Merle Schultz, John Spracklen, Gary Gibson, Bruce Lightner and David Isaman, "The Metaflow Architecture", *IEEE Micro*, Jun. 1991, pp. 10–13 and 63–73.

*Primary Examiner*—Ayaz R. Sheikh
*Assistant Examiner*—Xuong M. Chung-Trans
*Attorney, Agent, or Firm*—Blakely, Sokoloff, Taylor & Zafman LLP

[57] ABSTRACT

A method and apparatus for ordering data transfers includes an identifier of a critical portion of data being received from a requesting agent along with a request for data. Writeback data corresponding to the requested data is then transferred to the bus as a plurality of portions and ordered to ensure that a first portion which includes the critical portion of the data is transferred to the bus first.

15 Claims, 6 Drawing Sheets

METHOD AND APPARATUS FOR ORDERING WRITEBACK DATA TRANSFERS ON A BUS

BACKGROUND OF THE INVENTION

1. Field of the Invention

The present invention pertains to computer systems and computer system buses. More particularly, this invention relates to controlling the ordering of data transfers on a bus in a computer system.

2. Background

Modern computer systems typically have multiple agents coupled together via a system bus. Typically, the agents are integrated circuit chips with multiple pins coupling each agent to the bus. These agents may include, for example, processors, memory devices, mass storage devices, etc. Data is frequently transferred between these different agents on the bus. By way of example, data is often transferred from either a memory device or a bus bridge to a processor. In order for the computer system to operate properly, these agents should be able to effectively transfer data between each other via the bus.

The bus includes multiple data lines, each of which is capable of transferring one bit of data. The number of clock cycles that a bit of data is required to be on the data line in order to be received by another agent is dependent on the bus protocol, but typically ranges from one to a few clock cycles. The total number of data lines in a bus is referred to as the data bus width.

Modern computer systems also typically include one or more cache memories for storing data and/or instructions. A cache memory is typically smaller and faster than the main computer system memory and is used to temporarily store data for an agent(s). Cache memories store data in quantities referred to as cache lines, which are typically larger than the data bus width and also typically larger than the data path width within the processor(s) of the system. For example, a computer system may have a data bus width of 64 bits, but a cache line size of 256 bits.

Often times, when a requesting agent needs a portion of data from another agent on the bus, the requesting agent sends a request over the bus for the cache line which includes the needed portion. Thus, situations can arise where, for example, a request for data by a requesting agent (e.g., a processor) from a second agent (e.g., a memory device) can be a request for an amount of data, such as a cache line, which is greater than the data bus width. Therefore, the requested cache line is broken into multiple portions, each having the same number of bits as the data bus width, and these multiple portions are transferred to the requesting agent over a period of multiple clock cycles. By way of another example, data requested by a requesting agent (e.g., a processor) may be stored in a second agent's cache memory, and the cache line, which is greater than the data bus width, is returned to the requesting agent or another agent on the bus (e.g., a memory controller) from the second agent in multiple portions. However, in both examples these multiple portions are typically transferred in order from least significant to most significant byte of the cache line, without regard for which byte or bytes are actually needed by the requesting agent. Therefore, given that the second agent is transferring the entire cache line over multiple clock cycles, it would be beneficial to provide a mechanism for the particular portion of data which is needed by the requesting agent to be provided to that agent prior to the remaining portions.

As will be described in more detail below, the present invention provides a method and apparatus for ordering data transfers on a bus to achieve these and other desired results which will be apparent to those skilled in the art from the description that follows.

SUMMARY OF THE INVENTION

A method and apparatus for ordering data transfers on a bus is described herein. A request for data, which includes an identifier of a critical portion of the data, is received from a requesting agent. Writeback data corresponding to the requested data is then transferred to the bus as a plurality of portions and ordered to ensure that a first portion which includes the critical portion of the data is transferred to the bus first.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

In the discussions to follow, certain signals are discussed followed by a "#". This notation is used to indicate a signal which is active when in a low state (that is, a low voltage). It is to be appreciated, however, that the present invention may be implemented where these signals are active when in a high state rather than when in a low state. Similarly, the present invention may be implemented where signals discussed herein which are not followed by a "#" are active when in a low state.

The present invention provides a mechanism for the ordering of data transfers on a bus in a computer system. Data which is requested by an agent in a quantity greater than the data bus width is transferred to the requesting agent in multiple portions. The order of the transfer of these portions by the transferring agent is dependent upon the particular request by the requesting agent. The particular portion which is needed first by the requesting agent is transferred to the requesting agent first, followed by the remaining portions. This ordering allows the requesting agent to begin using the needed portion of data without waiting for the remaining portions to be transferred.

Figure 1:
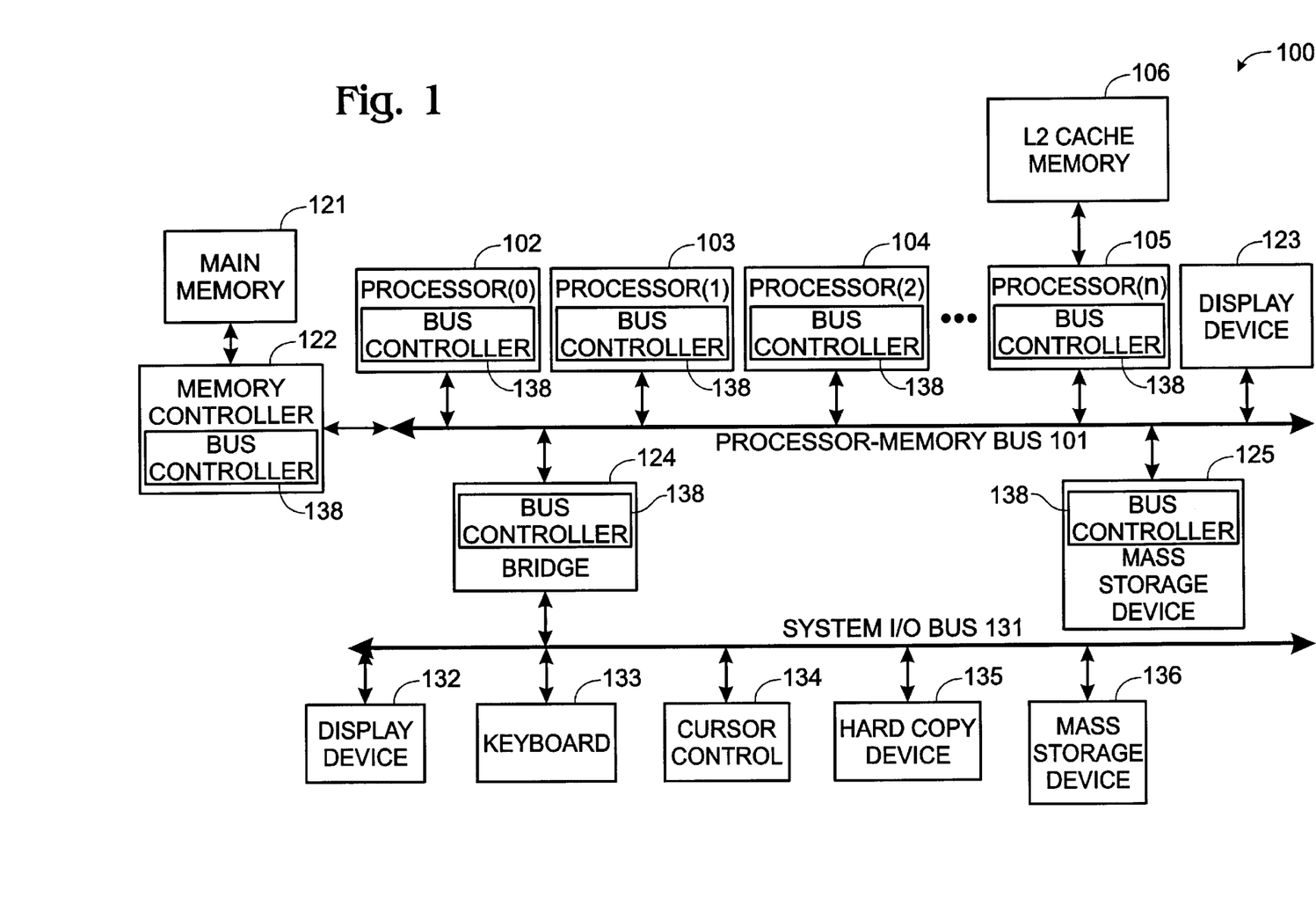
FIG. 1 illustrates a multiprocessor computer system such as may be used with one embodiment of the present invention.

FIG. 1 illustrates a multiprocessor computer system such as may be used with one embodiment of the present invention. The computer system 100 generally comprises a processor-memory bus or other communication means 101 for communicating information between different agents coupled to the bus 101, such as processors, bus bridges, memory devices, peripheral devices, etc. The processor-memory bus 101 includes arbitration, address, data and control buses (not shown). In one embodiment, each of the one or more processors 102, 103, 104, and 105 includes a small, extremely fast internal cache memory (not shown), commonly referred to as a level one (L1) cache memory for temporarily storing data and instructions on-chip. In addition, a bigger level two (L2) cache memory 106 can be coupled to any one of the processors, such as processor 105, for temporarily storing data and instructions for use by the processor(s). Each processor may have its own L2 cache, or some may share an L2 cache. In one embodiment of the present invention, the cache memories in the system 100 use the well-known MESI (Modified Exclusive Shared Invalid) protocol.

Processors 102, 103, and 104 may each be a parallel processor (a symmetric co-processor), such as a processor similar to or the same as processor 105. Alternatively, processor 102, 103, or 104 may be an asymmetric co-processor, such as a digital signal processor. In addition, processors 102 through 105 may include processors of different types. In one embodiment, the present invention includes Intel® Architecture microprocessors as processors 102 through 105, such as i386™, i486™, Pentium® or Pentium® Pro processors. However, the present invention may utilize any type of microprocessor architecture. It is to be appreciated that the particular architecture(s) used is not especially germane to the present invention.

The processor-memory bus 101 provides system access to the memory and input/output (I/O) subsystems. A memory controller 122 is coupled to the processor-memory bus 101 for controlling access to a random access memory (RAM) or other dynamic storage device 121 (commonly referred to as a main memory) for storing information and instructions for processors 102 through 105. A mass data storage device 125, such as a magnetic disk and disk drive, for storing information and instructions, and a display device 123, such as a cathode ray tube (CRT), liquid crystal display (LCD), etc., for displaying information to the computer user may be coupled to the processor-memory bus 101.

Each agent coupled to the bus 101 includes a bus controller 138. Each bus controller is identical to bus controllers within each other agent or, at least, is configured to perform a minimum set of identical functions of the bus controllers of every other agent. The bus 101 and the various bus controllers within each bus agent collectively provide a pipelined bus system, wherein multiple bus transactions are processed simultaneously.

An input/output (I/O) bridge 124 may be coupled to the processor-memory bus 101 and a system I/O bus 131 to provide a communication path or gateway for devices on either processor-memory bus 101 or I/O bus 131 to access or transfer data between devices on the other bus. Essentially, the bridge 124 is an interface between the system I/O bus 131 and the processor-memory bus 101.

The I/O bus 131 communicates information between peripheral devices in the computer system. Devices that may be coupled to the system bus 131 include, for example, a display device 132, such as a cathode ray tube, liquid crystal display, etc., an alphanumeric input device 133 including alphanumeric and other keys, etc., for communicating information and command selections to other devices in the computer system (e.g., the processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to the system bus 131.

In certain implementations of the present invention, additional processors or other components may be included. Additionally, in certain implementations components may be re-arranged. For example, the L2 cache memory 106 may lie between the processor 105 and the processor-memory bus 101. Furthermore, certain implementations of the present invention may not require nor include all of the above components. For example, the processors 102 through 104, the display device 123, or the mass storage device 125 may not be coupled to the processor-memory bus 101. Additionally, the peripheral devices shown coupled to the system I/O bus 131 may be coupled to the processor-memory bus 101; in addition, in some implementations only a single bus may exist with the processors 102 through 105, the memory controller 122, and the peripheral devices 132 through 136 coupled to the single bus.

Figure 2:
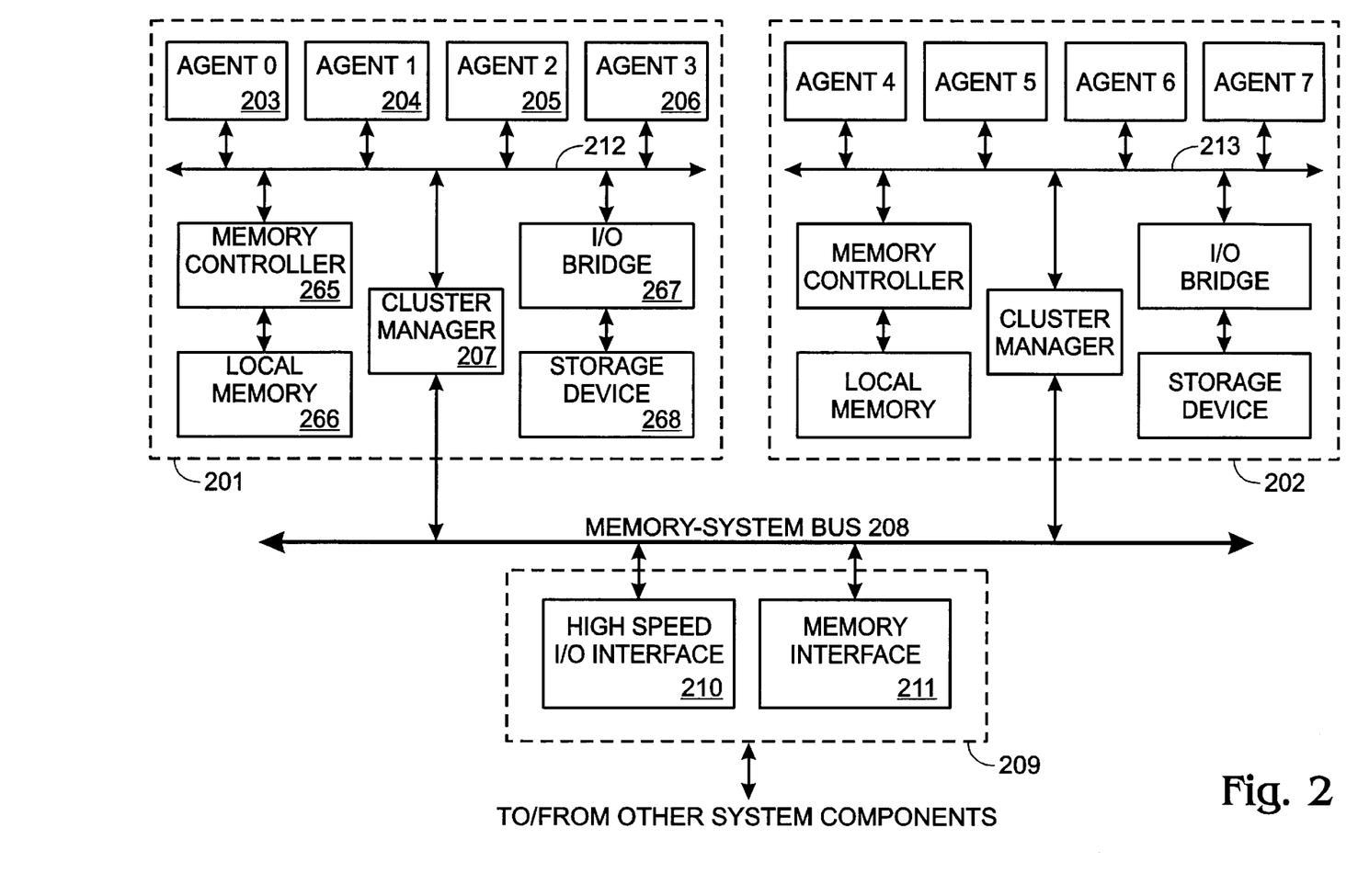
FIG. 2 is a block diagram illustrating a bus cluster system such as may be used with one embodiment of the present invention.

FIG. 2 is a block diagram illustrating a bus cluster system such as may be used with one embodiment of the present invention. FIG. 2 shows two clusters 201 and 202 of agents. Each of these clusters is comprised of a number of agents. For example, the cluster 201 is comprised of four agents 203–206 and a cluster manager 207, which may include another cache memory (not shown), coupled to the bus 212. The agents 203–206 can include microprocessors, co-processors, digital signal processors, etc.; for example, the agents 203 through 206 may be the same as the processor 105 shown in FIG. 1. The cluster manager 207 and its cache are shared between these four agents 203–206. Each cluster is coupled to a memory-system bus 208. These clusters 201 and 202 are coupled to various other components of the computer system through a system interface 209. The system interface 209 includes a high speed I/O interface 210 for interfacing the computer system to peripheral devices (not shown) and a memory interface 211 which provides access to a global main memory (not shown), such as a DRAM memory array. In one embodiment, the high speed I/O interface 210 is the bridge 124 of FIG. 1, and the memory interface 211 is the memory controller 122 of FIG. 1.

In one embodiment of the present invention, each cluster also includes a local memory controller and/or a local I/O bridge. For example, the cluster 201 may include a local memory controller 265 coupled to the processor bus 212. The local memory controller 265 manages accesses to a RAM or other local memory 266 contained within the cluster 201. The cluster 201 may also include a local I/O bridge 267 coupled to the processor bus 212. Local I/O bridge 267 manages accesses to I/O devices within the cluster, such as a mass storage device 268, or to an I/O bus, such as system I/O bus 131 of FIG. 1.

In another embodiment of the present invention, the local memory of each cluster is part of the memory and I/O space of the entire system, and is collectively referred to as the global memory and I/O space. Therefore, in this embodiment the system interface 209 need not be present because the individual local memory and I/O bridges can make up the global memory system.

In one embodiment of the present invention, the buses 212 and 213 and the memory-system bus 208 operate analogous to the processor-memory bus 101 of FIG. 1.

Certain implementations of the present invention may not require nor include all of the above components. For example, the cluster 201 or 202 may comprise fewer than four agents. Alternatively, the cluster 201 or 202 may not include the memory controller, local memory, I/O bridge, and storage device. Additionally, certain implementations of the present invention may include additional processors or other components.

In one embodiment of the present invention, bus transactions occur on the processor-memory buses described above in FIGS. 1 and 2 in a pipelined manner. That is, multiple bus transactions may be pending at the same time, wherein each is not fully completed. Therefore, when a requesting agent begins a bus transaction by driving an address onto the address bus, the bus transaction may be only one of a number of bus transactions currently pending. Although bus transactions are pipelined, the bus transactions do not have to be fully completed in order; completion replies to requests can be out-of-order.

In the bus used with one embodiment of the present invention, bus activity is hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions, or in unaligned memory operations which software expects to be atomic. In this embodiment, a transaction is the set of bus activities related to a single request, from request bus arbitration through the completion of the transaction (e.g., a normal or implicit writeback response) during the Response Phase.

In one embodiment, a transaction contains up to six distinct phases. However, certain phases are optional based on the transaction and response type. Alternatively, additional phases could also be added. A phase uses a particular signal group to communicate a particular type of information. In one implementation, these phases are:

Arbitration Phase
Request Phase
Error Phase
Snoop Phase
Response Phase
Data Transfer Phase In one mode, the data transfer phase is optional and is used if a transaction is transferring data. The data phase is request-initiated if the data is available at the time of initiating the request (for example, for a write transaction). The data phase is response-initiated if the data is available at the time of generating the transaction response (for example, for a read transaction). A transaction may contain both a request-initiated data transfer and a response-initiated data transfer.

Figure 3:
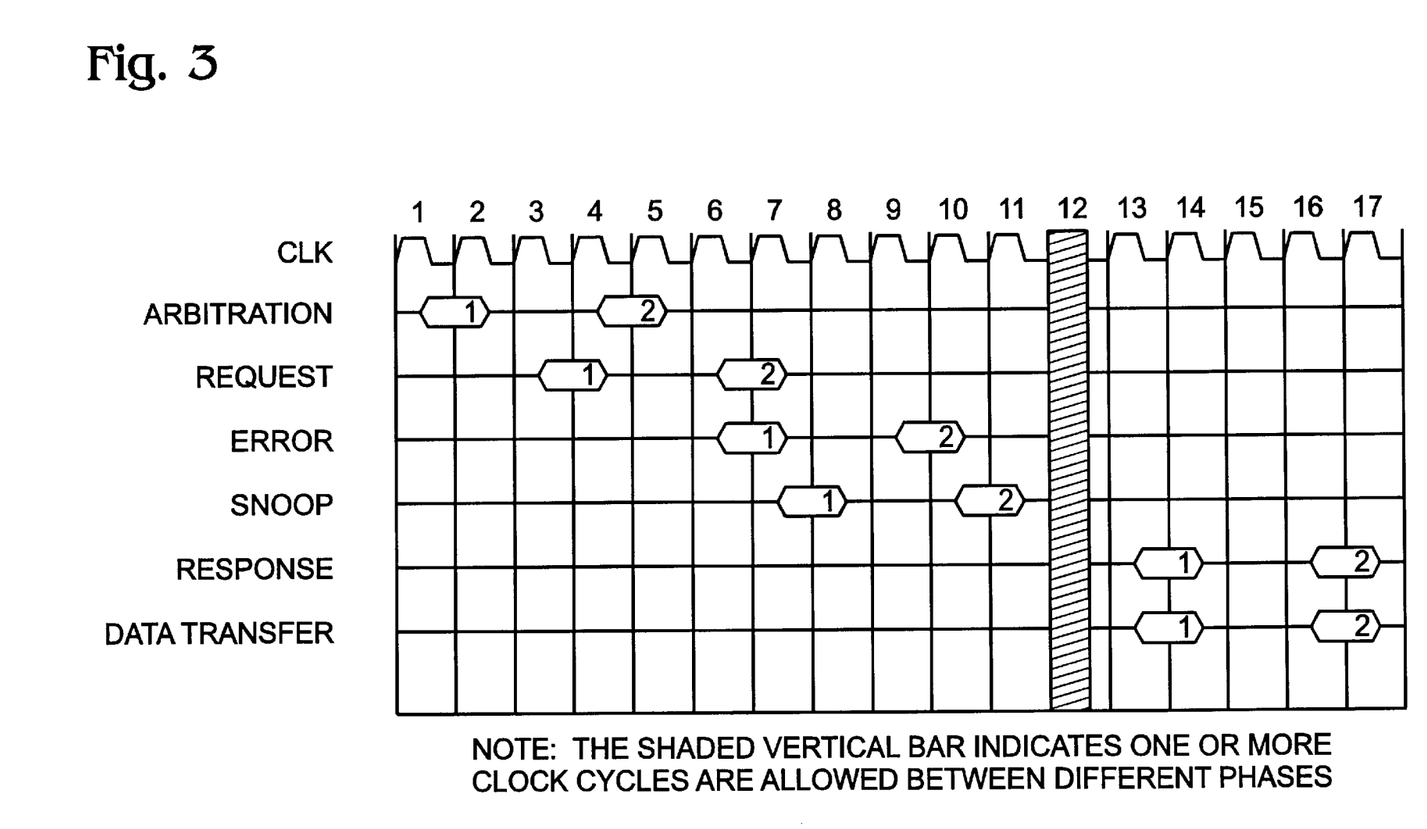
FIG. 3 shows an example of overlapped phases for two transactions according to one embodiment of the present invention.

Different phases from different transactions can overlap, thereby pipelining bus usage and improving bus performance. FIG. 3 shows an example of overlapped phases for two transactions. Referring to FIG. 3, transactions begin with an arbitration phase, in which a requesting agent becomes the bus owner. The arbitration phase needs to occur only if the agent that is driving the next transaction does not already own the bus. In one implementation, bus ownership is granted to the requesting agent in the arbitration phase two or more clocks after ownership is requested.

The second phase is the request phase, in which the bus owner drives a request and address information on the bus. In one implementation, the request phase is one or more clocks after bus ownership is granted (provided there is an arbitration phase), and is two clocks long. In the first clock, an address signal is driven along with the transaction type and sufficient information to begin snooping a memory access. In the second clock, byte enables used to identify which bytes of data should be transferred if the data transfer is less than the data bus width, a transaction identifier used to uniquely identify the transaction in the event a deferred response is to be given to the request, and the requested data transfer length are driven, along with other transaction information.

The third phase of a transaction is an error phase. The error phase indicates any immediate errors, such as parity errors, triggered by the request. If an error is discovered, an error signal is asserted during the error phase by the agent which detected the error in the transaction. When an error is indicated, the transaction is immediately dropped (that is, the transaction progresses no further in the pipeline) and may be re-driven by the agent which issued the transaction. Whether the agent re-issues the transaction depends on the agent itself. In one implementation, the error phase is three clocks after the request phase.

In one embodiment, every transaction that is not canceled because of an error in the error phase has a snoop phase. The snoop phase indicates if the cache line accessed in a transaction is not valid, valid or modified (dirty) in any agent's cache. In one implementation, the snoop phase is four or more clocks from the request phase.

The snoop phase of the bus defines a snoop window during which snoop events can occur on the bus. A snoop event refers to agents transmitting and/or receiving snoop results via the bus. An agent which has snoop results which need to be driven during the snoop phase drives these snoop results as a snoop event during the snoop window. All snooping agents coupled to the bus, including the agent driving the results, receive these snoop results as a snoop event during the snoop window. In one implementation, the snoop window is a single bus clock.

The response phase indicates whether the transaction failed or succeeded, whether the response is immediate or deferred, whether the transaction will be retried, or whether the transaction includes data phases. If a transaction contains a response-initiated data phase, then it enters the data transfer phase along with the response phase.

If the transaction does not have a data phase, then that transaction is complete after the response phase. If the requesting agent has write data to transfer or has requested read data, the transaction has a data phase which may extend beyond the response phase in the former case and will be coincident with or extend beyond the response phase in the latter case. The data phase occurs only if a transaction requires a data transfer. The data phase can be response initiated (for example, by the memory controller or another processor) or request initiated.

The bus accommodates deferred transactions by splitting a bus transaction into two independent transactions. The first transaction involves a request by a requesting agent and a response by the responding agent. In one embodiment the request comprises the sending of an address on the address bus and a first token (also referred to as a transaction identifier). The response includes the sending of the requested data (or completion signals) if the responding agent is ready to respond. In this case, the bus transaction ends.

However, if the responding agent is not ready to complete the bus transaction, then the responding agent may send a deferred response over the bus during the response phase. Sending of a deferred response allows other transactions to be issued and not be held up by the completion of this transaction. The requesting agent receives this deferred response. When the responding agent is ready to complete the deferred bus transaction, the responding agent arbitrates for ownership of the bus. Once bus ownership is obtained, the responding agent sends a deferred reply transaction including a second token on the bus. The requesting agent monitors the bus and receives the second token as part of the deferred reply transaction. The requesting agent latches the second token and determines whether the second token sent from the responding agent matches the first token. If the requesting agent determines that the second token from the responding agent does not match the first token (which the requesting agent generated), then the data on the bus (or the completion signal) is ignored and the requesting agent continues monitoring the bus. If the requesting agent determines that the second token from the responding agent does match the first token, then the data on the bus (or the completion signals) is the data originally requested by the requesting agent and the requesting agent latches the data on the data bus.

It is to be appreciated that, due to the pipelined nature of the bus, multiple transactions can be at different stages of the bus at different times. For example, one transaction can be in the snoop phase, while a second transaction is in the error phase, and yet a third transaction can be in the request phase. Thus, error signals and request signals can both be issued concurrently on the bus even though they correspond to different transactions.

In one embodiment of the present invention, up to eight transactions can be outstanding on the bus at any particular time and up to sixteen transactions can be waiting for a deferred response at any particular time.

Additionally, one embodiment of the present invention supports an implicit writeback, which is part of a read or write transaction. An implicit writeback occurs when a requesting agent places a request on the bus for a cache line which is stored in a modified state in a cache coupled to the bus. For example, an agent may perform a write transaction over the bus of eight bytes of data, however the cache line which includes those eight bytes is stored in modified state in the cache of another agent (referred to as the snooping agent). In this situation, the cache which contains the cache line in modified state (or the snooping agent) issues a hit modified signal on the bus during the snoop phase for the transaction. The requesting agent places the eight bytes of write data onto the bus, which are retrieved by the targeted agent. Then, in the data transfer phase of the transaction, the cache which contains the cache line in modified state writes the cache line, which is 32 bytes in one implementation, to the bus. This data written by the snooping agent is referred to as the writeback data. Any of the data in the cache line which was not written to by the requesting agent is then merged with the write data from the original data transfer.

In one embodiment of the present invention, a memory controller on the bus is responsible for merging together any write data with writeback data. Additionally, the memory controller also latches any data off the bus which is written back by a snooping agent in response to a read request. For example, this memory controller could be memory controller 122 of FIG. 1 or memory controller 265 of FIG. 2. The memory controller merges the new write data from the requesting agent with the writeback data from the snooping agent and stores the merged cache line into main memory. In merging, the memory controller combines the write data from the requesting agent with portions of the cache line from the snooping agent which were not written to by the requesting agent.

Figure 4:
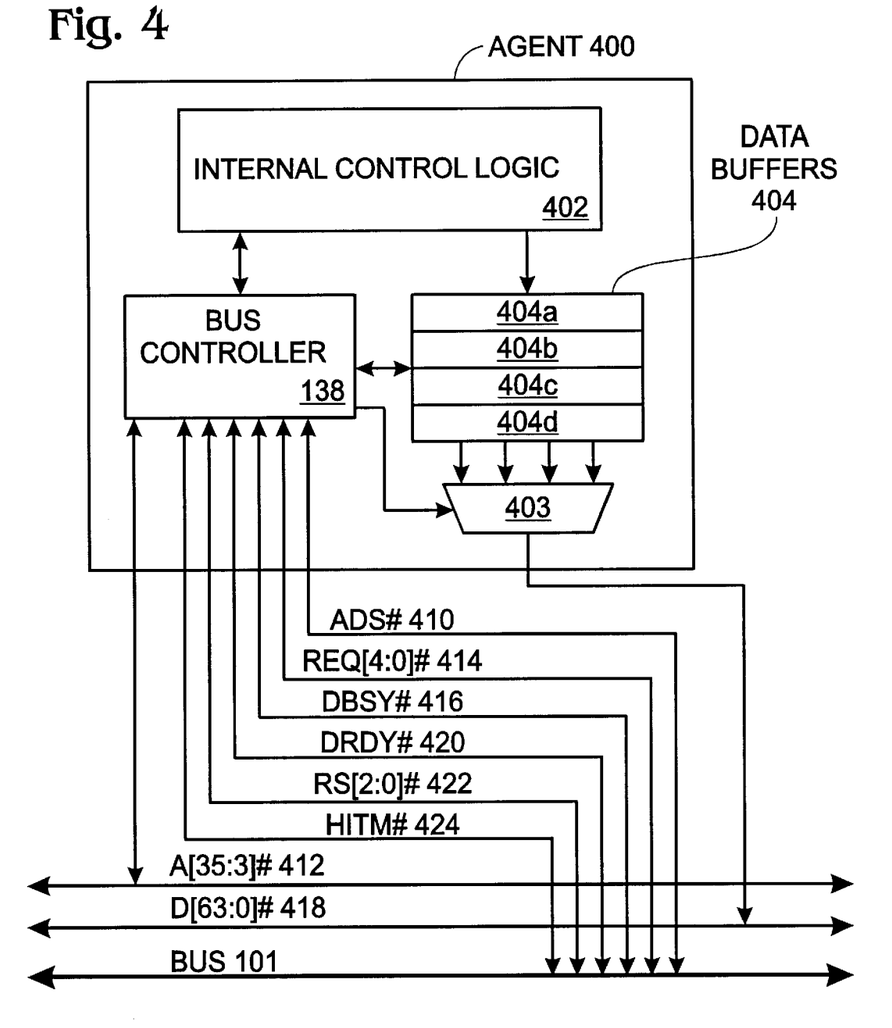
FIG. 4 is a block diagram illustrating an agent in more detail according to one embodiment of the present invention.

FIG. 4 is a block diagram illustrating an agent in more detail according to one embodiment of the present invention. The agent 400 is coupled to the bus 101 and includes a bus controller 138, an internal control logic 402, and data buffers 404.

The internal control logic 402 performs the internal functions of the agent. The exact functions performed by the internal control logic 402 depend on the nature of the agent 400. For example, the internal control logic 402 may include an execution unit(s) and possibly one or more cache memories if the agent 400 is a microprocessor. By way of another example, the internal control logic may include memory control logic for interfacing with dynamic random access memory (DRAM) if the agent 400 is a memory controller coupled to a main memory in computer system. It is to be appreciated that, depending on the nature of the agent 400, the internal control logic 402 may include additional connections to other devices within the computer system. For example, there may be a connection to another cache memory, such as L2 cache memory 106, or to a main memory, such as main memory 121 of FIG. 1.

The data buffers 404 temporarily store data that is being transferred from the agent 400 to another agent via the bus 101. The buffers 404 as illustrated are used only for outputting data to the bus 101, however, in alternate embodiments the buffers 404 may also be used to temporarily store data being input to the agent.

According to one embodiment of the present invention, the data buffers 404 comprise four separate buffers 404*a*, 404*b*, 404*c*, and 404*d*, each capable of storing 64 bits of data.

A request for data by a requesting agent is received by the bus controller 138 of the agent 400 and forwarded to the internal control logic 402. The internal control logic 402 decodes the request and, provided the agent 400 has the requested cache line, transfers the cache line which contains the requested data into the data buffers 404. As discussed above, the agent responding to the request is not necessarily the agent which was targeted by the request. For example, a write transaction to main memory may cause the writeback of a modified cache line from a snooping agent. Each of the individual buffers 404 stores one portion of the cache line. In one implementation, each of these portions is the amount of data which can be transferred at any one time via the bus 101 (for example, the data bus width). In the illustrated embodiment, a portion is 64 bits.

When the agent 400 receives a request from another agent for a cache line, the bus controller 138 receives an identifier of a particular requested portion, referred to as the "critical portion". The bus controller 138 controls the ordering of the transfer of the data to the bus so that the critical portion is placed on the bus first. Thus, the requesting agent or other agent receiving writeback data (e.g., the memory controller) receives the critical portion first.

The bus controller 138 controls the transfer of data from the buffers 404 to the data lines D[63:0]# 418. According to one embodiment, each of the data buffers 404 is input to a multiplexer 403. The multiplexer 403 is controlled by the bus controller 138, thereby allowing the bus controller 138 to control which portion of data is transferred to the data lines D[63:0]# 418 at any particular time.

According to one embodiment of the present invention, data is placed into the data buffers 404 in order by the internal control logic 402. By way of example, if the data is retrieved from an L2 cache memory coupled to the agent 400, then the data may be retrieved from the L2 cache critical portion first. Thus, in this embodiment, the bus controller 138 provides the data to the requesting agent via the data lines D[63:0]# 418 in the same order as it was received from the L2 cache memory, with the critical portion being transferred first.

In an alternate embodiment, the data is placed in the data buffers 404 by the internal control logic 402 in a predetermined order. In this embodiment, both the internal control logic 402 and the bus controller 138 know the predetermined order, and the bus controller 138 therefore knows which of the data buffers 404 stores the critical portion of data. By way of example, the first portion of the cache line may be placed in buffer 404a, the second portion in buffer 404b, the third portion in buffer 404c, and the fourth portion in buffer 404d.

In the illustrated embodiment, the bus 101 is shown as separate from the address signal lines A[35:3]# 412 and data lines D[63:0]# 418. However, it is to be appreciated that the A[35:3]# signal lines 412 and D[63:0]# lines 418 are part of the bus 101.

In one embodiment of the present invention, agents can identify data to each other (e.g., request data) using addresses with one-byte boundaries. By way of example, a specific byte can be requested, but a specific bit within that byte cannot. Thus, the lower three bits of the address do not need to be transferred between agents when identifying a particular address.

The amount of data being requested by an agent is encoded by the requesting agent on the REQ[4:0]# lines. According to one embodiment, a write of at least one byte by the requesting agent causes a writeback of a full modified cache line by a snooping agent.

Figure 5:
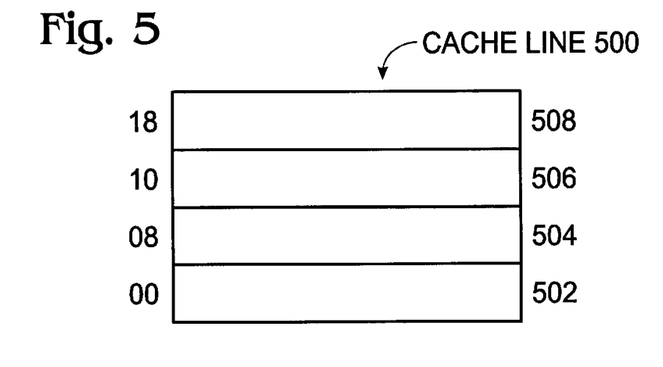
FIG. 5 illustrates the four chunks of a cache line according to one embodiment of the present invention.

FIG. 5 illustrates the four portions of a cache line according to one embodiment of the present invention. The addresses of the different portions of a cache line 500, in hexadecimal format, are illustrated. As shown, portion 502 has an address of $00_{16}$, portion 504 has an address of $08_{16}$, portion 506 has an address of $10_{16}$, and portion 508 has an address of $18_{16}$. The specific cache line in the computer system to which any particular cache line 500 corresponds is identified by the remaining more significant bits, bits [35:5] in the illustrated embodiment.

As discussed above, when the requesting agent requests a cache line, the bus controller of the agent which will respond with the data orders the return of the four portions of data so that the requested portion is returned first, followed by the remaining portions. In one embodiment, the particular requested portion, also referred to as the "critical portion", is identified by the requesting agent using the A[4:3]# lines. The ordering of the portions for transfer according to one embodiment of the present invention is shown in Table I. However, it is to be appreciated that the ordering of the second through fourth portions can be varied.

TABLE I

| A[4:3]# | First Portion Transferred | Second Portion Transferred | Third Portion Transferred | Fourth Portion Transferred |
| --- | --- | --- | --- | --- |
| 00 | $00_{16}$ | $08_{16}$ | $10_{16}$ | $18_{16}$ |
| 01 | $08_{16}$ | $00_{16}$ | $18_{16}$ | $10_{16}$ |
| 10 | $10_{16}$ | $18_{16}$ | $00_{16}$ | $08_{16}$ |
| 11 | $18_{16}$ | $10_{16}$ | $08_{16}$ | $00_{16}$ |

Multiple address, data, and control signals are used during the transfer of data from one agent to another via a bus. A summary of these signals used according to one embodiment of the present invention is shown below in Table II.

TABLE II

| Signal | Description |
| --- | --- |
| CLK | The bus clock. |
| ADS# | Address Strobe. Asserted by the requesting agent to indicate the beginning of the Request Phase for a transaction. |
| A[35:3]# | Address. The bus lines used to transfer the address for a request. |
| REQ[4:0]# | Request. Used to encode the particular request of the requesting agent, including the length of the requested data transfer. |
| HITM# | Modified Hit. Asserted by a snooping agent to indicate that the request hits a modified cache line of the agent's cache. |
| DBSY# | Data Bus Busy. Asserted by the agent transferring data to indicate it is using the data bus. |
| D[63:0]# | Data. The bus lines used to transfer the data. |
| DRDY# | Data Ready. Asserted by the agent transferring data to indicate valid data is on the bus. |
| RS[2:0]# | Response Status. Asserted by the targeted agent to indicate the status of the response (e.g., Retry Response, Deferred Response, Failure, Implicit Writeback Response, or Normal Data Response). |

Figure 6:
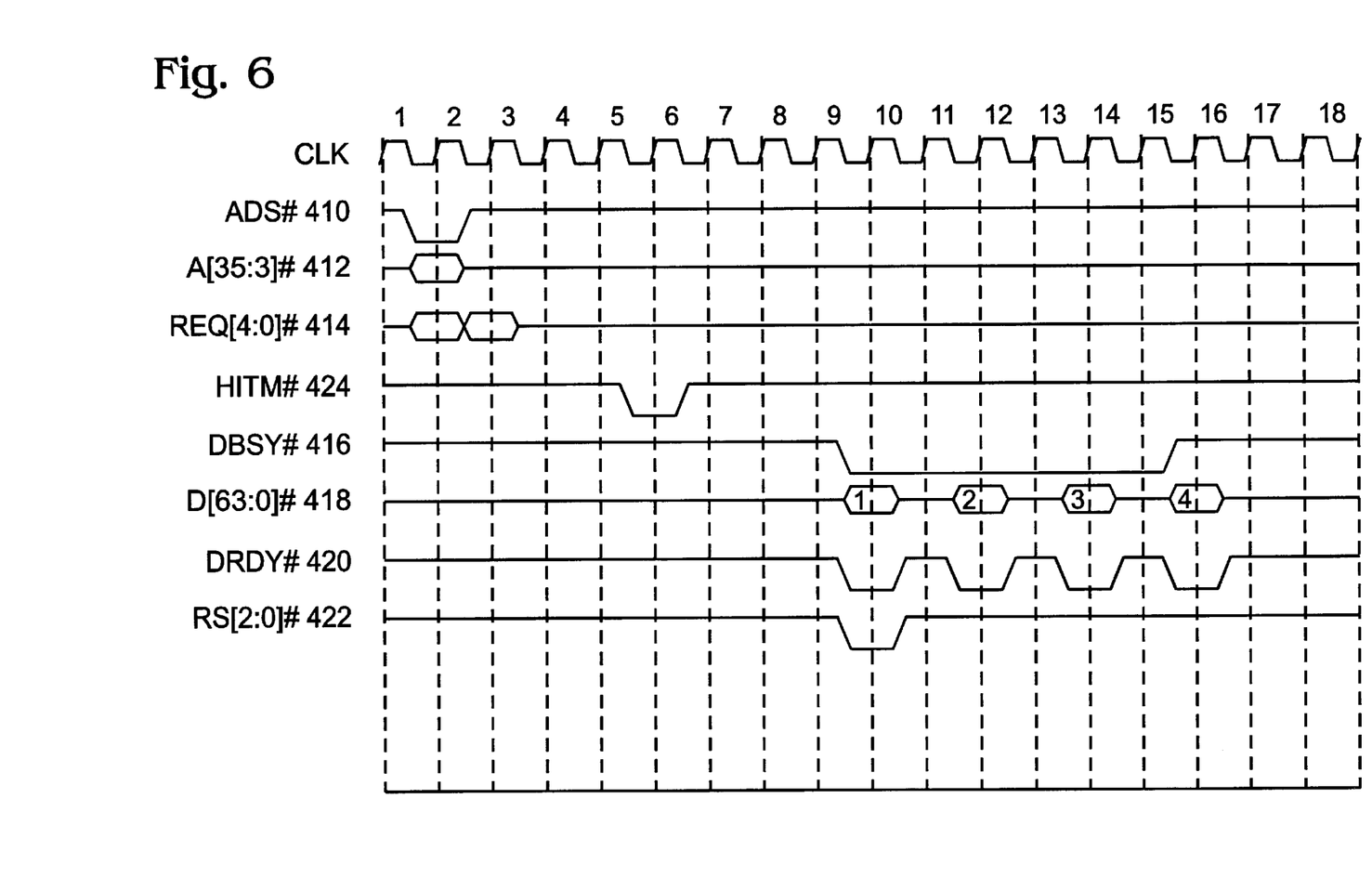
FIG. 6 is a timing diagram illustrating the timing of signals in performing a read transaction with an implicit writeback according to one embodiment of the present invention.

FIG. 6 is a timing diagram illustrating the timing of signals in performing a read transaction with an implicit writeback according to one embodiment of the present invention. The requesting agent asserts the ADS# signal 410 and A[35:3]# signals 412 in clock cycle 1, which are observed by the other agents coupled to the bus in clock cycle 2. The requesting agent asserts the REQ[4:01]# signals 414 on the bus in clock cycles 2 and 3, which are observed by the other agents coupled to the bus in clocks cycles 3 and 4. In clock cycle 5, the snooping agent asserts HITM# signal 424 to indicate the cache line including the requested data is in the snooping agent's cache in a modified state. In clock cycle 9, the snooping agent asserts the DBSY# signal 416, along with the D[63:0]# signals 418 and the DRDY# signal 420. The DBSY# signal 416 is deasserted in the clock cycle in which the last portion of data is driven, clock cycle 15 as illustrated. The DRDY# signal 420 is asserted in each clock cycle where valid data is on the bus, clock cycles 9, 11, 13, and 15, as illustrated. Each portion of data is then sampled by the requesting agent in the clock cycle after it is driven by the snooping agent, clock cycles 10, 12, 14, and 16 as illustrated. The agent targeted by the request asserts the RS[2:0]# signals 422 in clock cycle 9, which are sampled by the other agents coupled to the bus in clock cycle 10.

For the request illustrated in FIG. 6, four portions of writeback data are listed as 1, 2, 3, and 4, corresponding to the first, second, third and fourth portions of the data transfer, respectively. As discussed above, the first portion of the data transfer is the critical portion, followed by the remaining portions in the cache line. In FIG. 6, the four portions of data are illustrated as being transferred in every other clock cycle. It is to be appreciated that in alternate implementations, the data can be transferred in back to back clock cycles.

Figure 7:
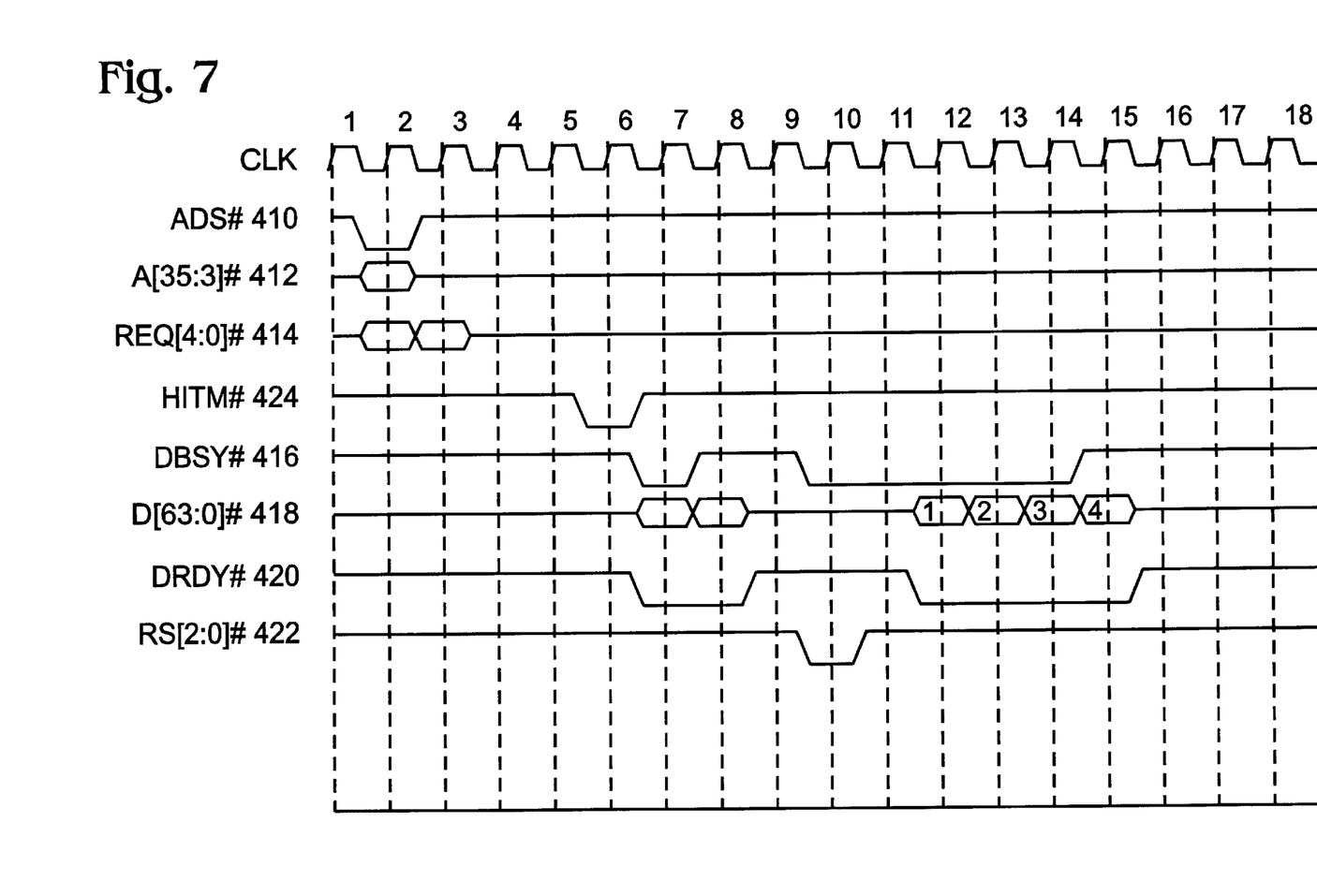
FIG. 7 is a timing diagram illustrating the timing of signals in performing a write transaction with an implicit writeback according to one embodiment of the present invention.

FIG. 7 is a timing diagram illustrating the timing of signals in performing a write transaction with an implicit writeback according to one embodiment of the present invention. The requesting agent asserts the ADS# signal 410 and A[35:3]# signals 412 in clock cycle 1, which are observed by the other agents coupled to the bus in clock cycle 2. The requesting agent asserts the REQ[4:0]# signals 414 on the bus in clock cycles 2 and 3, which are observed by the other agents coupled to the bus in clocks cycles 3 and 4. In clock cycle 5, the snooping agent asserts HITM# signal 424 to indicate the cache line including the requested data is in the snooping agent's cache in a modified state. In clock cycle 6, the requesting agent asserts the DBSY# signal 416 and DRDY# signal 420, along with the D[63:0]# signals 418. The data being written by the requesting agent is asserted on the bus in clock cycles 6 and 7 and is sampled by the targeted agent (e.g., a memory controller) in clock cycles 7 and 8.

In clock cycle 9, the snooping agent asserts the DBSY# signal 416, along with the D[63:0]# signals 418. The writeback data being written by the snooping agent is asserted on the bus in clock cycles 11, 12, 13, and 14. Each portion of data is then sampled by the memory controller in the clock cycle after it is driven by the snooping agent, clock cycles 12, 13, 14, and 15 as illustrated. The DBSY# signal 416 is deasserted in the clock cycle in which the last portion of data is driven, clock cycle 15 as illustrated. The DRDY# signal 420 is asserted in each clock cycle where valid data is asserted on the bus, clock cycles 11, 12, 13, and 14 as illustrated. The agent targeted by the request asserts the RS[2:0]# signals 422 in clock cycle 9, which are sampled by the other agents coupled to the bus in clock cycle 10.

For the request illustrated in FIG. 7, four portions of writeback data are transferred as a series, one after the other. These four portions are listed as 1, 2, 3, and 4, corresponding to the first, second, third and fourth portions of the data transfer, respectively. As discussed above, the first portion of the data transfer is the critical portion, followed by the remaining portions in the cache line.

As discussed above, it is to be appreciated that the targeted agent may not necessarily be the agent providing the data in response to a read request. It is to be appreciated that the present invention applies to any agent which is providing data on the bus in response to a request for data by another agent.

In the discussions above, embodiments of the present invention have been discussed with particular addresses and signals, as well as sizes such as cache line sizes, data sizes, and data bus widths. However, it is to be appreciated that these addresses, signals, and sizes are examples only, and that any of a wide range of addresses, signals and sizes can be used within the spirit and scope of the present invention.

In the discussions above, embodiments of the present invention have been discussed with reference to data transfers via the processor-memory bus 101. However, it is to be appreciated that the present invention can be used with any bus which supports data transfers of greater than the data bus width.

Additionally, requests for entire cache lines have been discussed. It is also to be appreciated that the present invention can be used with any size data transfers where the amount of data being transferred is greater than the data bus width.

Also in the discussions above, reference is made to a particular portion of data being identified by the requesting agent as a critical portion. However, in alternate embodiments, a smaller segment of the cache line can be referenced as a critical portion. For example, an agent may request a specific byte of data, and the portion of data which includes that byte is the first portion to be transferred over the bus in response to the request. It is to be appreciated that additional addresses and/or other control lines can be added to the bus to support this alternate embodiment.

Thus, the present invention provides a mechanism for transferring an amount of data, such as a cache line, which is larger that the data bus width over the bus in an efficient manner. The data is transferred so that the actual portion of data requested by the requesting agent is transferred first, followed by the remaining bytes in the cache line. Thus, the present invention allows a requesting agent to first receive the portion of data which was specifically requested, followed by the remaining bytes in the cache line, rather than forcing the requesting agent to wait for the transfer of bytes in the cache line which are not yet needed.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

Thus, a method and apparatus for ordering writeback data transfers on a bus has been described.

What is claimed is:

1. In a computer system having a bus, a method of providing writeback data on the bus, the method comprising:

receiving, from a requesting agent, a request for data, wherein the request includes an identifier of a critical portion of the data;

buffering a plurality of portions of the requested data in a corresponding plurality of data buffers in response to receiving the request for data from the requesting agent;

transferring writeback data corresponding to the requested data to the bus as a plurality of portions; and ordering the writeback data to ensure that a first portion of the plurality of portions which includes the critical portion of the data is transferred to the bus first.

2. The method of claim 1, wherein each portion is larger than a data bus width of the bus.

3. The method of claim 2, wherein the critical portion of the data is an 8-byte portion of the cache line.

4. The method of claim 1, wherein the identifier comprises a plurality of bits of an address corresponding to the request for data.

5. The method of claim 1, wherein the writeback data is a cache line which includes the requested data.

6. A computer system comprising:

a bus;

a first agent coupled to the bus; and a second agent coupled to the bus, wherein the second agent includes, a plurality of data buffers to receive up to a corresponding plurality of portions of writeback data in response to a request from the first agent;

a bus controller coupled to the bus and a plurality of data buffers to receive up to a corresponding plurality of portions of writeback data, configured to receive a request for data from the first agent, wherein the request includes an identifier of a critical portion of the data, and wherein the bus controller is also configured to transfer the plurality of portions of writeback data from the plurality of data buffers to the bus ordered to ensure that a first portion of the plurality of portions which includes the critical portion of the data is transferred to the bus first.

7. The computer system of claim 6, wherein the identifier comprises a plurality of bits of an address corresponding to the request.

8. The computer system of claim 6, wherein the data is a cache line and wherein each of the plurality of data buffers stores an 8-byte portion of the cache line.

9. An apparatus comprising:

a bus controller to receive a request for data from another agent via a bus, wherein the request includes an identifier of a critical portion of the data;

a plurality of data buffers, coupled to the bus controller, wherein each of the plurality of data buffers stores a portion of writeback data corresponding to the requested data; and wherein the bus controller is also configured to transfer the writeback data to the bus as a series of portions ordered to ensure that a first portion of the series of portions which includes the critical portion is transferred to the bus first.

10. The apparatus of claim 9, wherein the identifier comprises a plurality of bits of an address corresponding to the request.

11. The apparatus of claim 9, wherein the data is a cache line and wherein each of the plurality of data buffers stores an 8-byte portion of the cache line.

12. In a computer system having a bus, an apparatus for providing writeback data on the bus, the apparatus comprising:

means for receiving, from a requesting agent, a request for data, wherein the request includes a means for identifying a critical portion of the data;

means for buffering a plurality of portions of writeback data corresponding to the requested data;

means for transferring the plurality of portions of writeback data from the buffering means to the bus; and means for ordering the writeback data to ensure that a first portion of the plurality of portions which includes the critical portion of the data is transferred to the bus first.

13. The apparatus of claim 12, wherein each portion is larger than a data bus width of the bus.

14. The apparatus of claim 13, wherein the critical portion of the data is an 8-byte portion of the cache line.

15. The apparatus of claim 12, wherein the means for identifying comprises a plurality of bits of an address corresponding to the request for data.

* * * * *